(12) United States Patent
Bartolucci et al.

(10) Patent No.: US 11,489,751 B2
(45) Date of Patent: Nov. 1, 2022

(54) BLOCKCHAIN-BASED METHODS AND DEVICE FOR PROPAGATING DATA IN A NETWORK

(71) Applicant: nChain Licensing AG, Zug (CH)

(72) Inventors: Silvia Bartolucci, London (GB); Simone Madeo, London (GB)

(73) Assignee: nChain Licensing AG, Zug (CH)

( * ) Notice: Subject to any disclaimer, the term of this patent is extended or adjusted under 35 U.S.C. 154(b) by 53 days.

(21) Appl. No.: 16/969,509

(22) PCT Filed: Feb. 8, 2019

(86) PCT No.: PCT/IB2019/051019
§ 371 (c)(1),
(2) Date: Aug. 12, 2020

(87) PCT Pub. No.: WO2019/159045
PCT Pub. Date: Aug. 22, 2019

(65) Prior Publication Data
US 2020/0403899 A1    Dec. 24, 2020

(30) Foreign Application Priority Data
Feb. 13, 2018    (GB) ...................... 1802347

(51) Int. Cl.
*H04L 45/02*    (2022.01)
*H04L 9/06*    (2006.01)
(Continued)

(52) U.S. Cl.
CPC ............ *H04L 45/02* (2013.01); *H04L 9/0637* (2013.01); *H04L 45/16* (2013.01); *H04L 47/125* (2013.01); *H04L 9/50* (2022.05); *H04L 63/0407* (2013.01)

(58) Field of Classification Search
CPC ........ H01Q 1/24; H04W 52/14; H04W 40/02; H04W 24/02; H04B 1/3827; H04L 63/1441; H04L 63/0421; H04L 63/123
See application file for complete search history.

(56) References Cited

U.S. PATENT DOCUMENTS 6,549,522 B1    4/2003    Flynn
2007/0180083 A1    8/2007    Adam et al.
(Continued)

FOREIGN PATENT DOCUMENTS

WO    2013177660 A1    12/2013
WO    2015120539 A1    8/2015

OTHER PUBLICATIONS

Antonopoulos, "Mastering Bitcoin—Unlocking Digital Cryptocurrencies," O'Reilly Media, Inc., Dec. 20, 2014, 282 pages.
(Continued)

*Primary Examiner* — Iqbal Zaidi
(74) *Attorney, Agent, or Firm* — Davis Wright Tremaine LLP

(57) ABSTRACT

A method of propagating data packets in a network of nodes is disclosed. The method, implemented at one of the nodes, includes: generating at least one data packet of a first type; collecting a set of data packets of the first type during a first time period, the set including the at least one generated data packet and at least one data packet of the first type received from one or more first nodes in the network; and determining a mapping of the data packets of the set to a plurality of neighbouring nodes connected to the node, the mapping indicating an expected time of relay of each data packet of the set to neighbouring nodes, wherein determining the mapping includes determining at least one of: a first sub-mapping which allocates any two data packets having a same source for relay to different subsets of the neighbouring nodes; and a second sub-mapping which assigns differ- (Continued)

ent expected times of relay to any two data packets that are generated at the node or received by the node from the one or more first nodes in a same time interval.

20 Claims, 11 Drawing Sheets

(51) Int. Cl.
    *H04L 45/16*     (2022.01)
    *H04L 47/125*     (2022.01)
    *H04L 9/40*     (2022.01)
    *H04L 9/00*     (2022.01)

(56) References Cited

U.S. PATENT DOCUMENTS

| | | | |
|---|---|---|---|
| 2009/0285212 | A1 | 11/2009 | Chu et al. |
| 2015/0043554 | A1 | 2/2015 | Meylan et al. |
| 2016/0269102 | A1* | 9/2016 | Park ............... H04L 1/0057 |
| 2017/0026468 | A1 | 1/2017 | Kumar et al. |
| 2017/0070912 | A1 | 3/2017 | Kozat et al. |
| 2019/0082007 | A1* | 3/2019 | Klarman ............ H04L 67/1091 |
| 2019/0098625 | A1* | 3/2019 | Johnson .............. H04B 7/026 |

OTHER PUBLICATIONS

Biryukov et al., "Deanonymisation of Clients in Bitcoin P2P Network," Jul. 5, 2014, 15 pages.
Bojja et al., "Dandelion: Redesigning the Bitcoin Network for Anonymity," Jan. 16, 2017, 19 pages.
Fanti et al., "Spy vs. Spy: Rumor Source Obfuscation," Apr. 26, 2015, 14 pages.
International Search Report and Written Opinion dated Apr. 11, 2019, Patent Application No. PCT/IB2019/051019, 10 pages.
Koshy et al., "An Analysis of Anonymity in Bitcoin Using P2P Network Traffic," Nov. 9, 2014, 17 pages.
Nakamoto, "Bitcoin: A Peer-to-Peer Electronic Cash System," Bitcoin, Oct. 31, 2008, https://bitcoin.org/bitcoin.pdf, 9 pages.
Neudecker et al., "Timing Analysis for Inferring the Topology of the Bitcoin Peer-to-Peer Network," 2016 International IEEE Conferences on Ubiquitous Intelligence & Computing, Advanced and Trusted Computing, Scalable Computing and Communications, Cloud and Big Data Computing, Internet of People, and Smart World Congress (UIC/ATC/ScalCom/CBDCom/IoP/SmartWorld), Jul. 18, 2016, https://www.dsn.kastel.kit.edu/publications/files/323/bitcoin_timing_analysis_dsn.pdf, 10 pages.
Pedrosa, "Network Traffic Anonymity," retrieved from https://fenix.tecnico.ulisboa.pt/downloadFile/395143811308/dissertacao.pdf, Oct. 2011, 98 pages.
Raymond, "Traffic Analysis: Protocols, Attacks, Design Issues and Open Problems," Dec. 19, 2000, 21 pages.
Satoshi et al., "Connection Limits," Bitcoin Forum, Aug. 9, 2010, https://bitcointalk.org/index.php?topic=741.0; prev_next=prev, 2 pages.
Serjantov et al., "From a Trickle to a Flood: Active Attacks on Several Mix Types," retrieved from https://www.freehaven.net/doc/batching-taxonomy/taxonomy.pdf, Dec. 18, 2002, 17 pages.
Tschorsch et al., "Bitcoin and beyond: A technical survey on decentralized digital currencies," IEEE Communications Surveys and Tutorials 18(3):2084-123, Mar. 2, 2016.
UK Commercial Search Report dated Jun. 26, 2018, Patent Application No. GB 1802347.3, 7 pages.
Uk IPO Search Report dated Aug. 3, 2018, Patent Application No. GB1802347.3, 7 pages.
Wang et al., "Towards Better Understanding of Bitcoin Unreachable Peers," arXiv preprint arXiv: 1709.06837, Sep. 20, 2017, https://arxiv.org/pdf/1709.06837.pdf, 7 pages.

\* cited by examiner

BLOCKCHAIN-BASED METHODS AND DEVICE FOR PROPAGATING DATA IN A NETWORK

This invention relates generally to computer networks, and more particularly to methods and devices to propagate data in a network of nodes, electronic communications and networking technologies. It is particularly suited for use in relation to blockchain technologies. In particular, it relates to secure transmission of data, and for the reduction of potentially malicious events and attacks by third parties, i.e. attacks.

In this document we use the term 'blockchain' to include all forms of electronic, computer-based, distributed ledgers. These include, but are not limited to blockchain and transaction-chain technologies, permissioned and un-permissioned ledgers, shared ledgers and variations thereof. The most widely known application of blockchain technology is the Bitcoin ledger, although other blockchain implementations have been proposed and developed. While Bitcoin may be referred to herein for the purpose of convenience and illustration, it should be noted that the invention is not limited to use with the Bitcoin blockchain and alternative blockchain implementations and protocols fall within the scope of the present invention. The term "Bitcoin" is used herein to include any and all variations of protocol, blockchain and implementations deriving from the Bitcoin protocol or blockchain.

A blockchain is a consensus-based, electronic ledger which is implemented as a computer-based decentralised, distributed system made up of blocks which in turn are made up of transactions. Each transaction is a data structure that encodes the transfer of control of a digital asset between participants in the blockchain system, and includes at least one input and at least one output. Each block contains a hash of the previous block so that blocks become chained together to create a permanent, unalterable record of all transactions which have been written to the blockchain since its inception. Transactions contain small programs known as scripts embedded into their inputs and outputs, which specify how and by whom the outputs of the transactions can be accessed. On the Bitcoin platform, these scripts are written using a stack-based scripting language.

Network nodes that receive a new transaction will quickly try to push that transaction out to other nodes in the network. Before transmitting a new transaction to other nodes, it is "validated", meaning it is checked against a set of criteria to ensure the transaction meets the basic requirements for a proper transaction according to the applicable blockchain protocol.

In order for a transaction to be written to the blockchain, it is incorporated into a block by a node (a "miner" or "mining node") that is designed to collect transactions and form them into blocks. The miner then attempts to complete a "proof of work" with respect to the node. Miners throughout the blockchain network compete to be the first to assemble a block of transactions and complete the associated proof of work for that block. The successful miner adds its confirmed block to the blockchain and the block is propagated through the network so that other nodes that maintain a copy of the blockchain can update their records. Those nodes receiving a block also "validate" that block and all the transactions in it to ensure it complies with the formal requirements of the protocol.

One of the perceived advantages of blockchain technology, such as Bitcoin, is the anonymity of transactions. Personal details of a Bitcoin user are not formally and explicitly attached to Bitcoin addresses, and the Bitcoin ledger of the blockchain only contains public address information. However, since a blockchain is structured as a distributed, peer-to-peer network operating on top of the Internet, anonymity of transactions may be compromised by attacks that use Internet Protocol (IP) address information to link users with network activity. By way of illustration, de-anonymization attacks, such as IP traffic analysis, conducted on a blockchain-based network may enable interested third-parties to monitor transactions submitted by users on the network and use publicly available information to link the transactions to their sources, for example, by linking user's public keys with their IP addresses.

Traffic analysis is particularly problematic for a blockchain-based network, which relies on propagation of transactions by and between network nodes. Each node in the network that receives a transaction validates the transaction and subsequently sends it to peer nodes. For example, in the Bitcoin protocol, a node will send an "INV" message containing a list of transactions to a peer node and receive a "GETDATA" response message selecting some subset of the transactions advertised in the "INV" message. The node then sends the requested transactions to the peer node. This process is carried out with respect to each peer node to which the node is connected. An attacker may intercept and analyse data that is transmitted when transactions are propagated in the network, and ultimately gain information which can be used to link sources and destinations of transactions.

It would be desirable to provide techniques for propagating transactions in blockchain-based networks which can reduce the likelihood of compromise of network anonymity through traffic analysis or other types of de-anonymization attacks. More generally, it would be desirable to provide techniques for relaying data between nodes of a peer-to-peer network to reduce the vulnerability to de-anonymization attacks.

Such a solution has now been devised.

Thus, in accordance with the present invention there are provided methods and devices as defined in the appended claims.

The present application describes a node to propagate data packets in a network of nodes, where each node in the network has one or more connections to other nodes. The node may be arranged to: generate at least one data packet of a first type; collect a set of data packets of the first type during a first time period, the set including the at least one generated data packet and at least one data packet of the first type received from one or more first nodes in the network; and determine a mapping of the data packets of the set to a plurality of neighbouring nodes connected to the node, the mapping indicating an expected time of relay of each data packet of the set to neighbouring nodes. Determining the mapping of the data packets of the set to the plurality of neighbouring nodes may include determining at least one of: a first sub-mapping which allocates any two data packets having a same source for relay to different subsets of the neighbouring nodes; and a second sub-mapping which assigns different expected times of relay to any two data packets that are generated at the node or received by the node from the one or more first nodes in a same time interval. The node may be further arranged to transmit the data packets of the set to the plurality of neighbouring nodes according to the determined mapping.

The node may include a processor, a network interface to provide network connectivity, and memory. The memory may include processor-executable instructions that, when executed by the processor, cause the processor to carry out the operations described above.

The present application describes a computer-implemented method. It may be described as a method of propagating data packets in a network of nodes, where each node in the network has one or more connections to other nodes. The method, which may be implemented at one of the nodes, may include: generating at least one data packet of a first type; collecting a set of data packets of the first type during a first time period, the set including the at least one generated data packet and at least one data packet of the first type received from one or more first nodes in the network; and determining a mapping of the data packets of the set to a plurality of neighbouring nodes connected to the node, the mapping indicating an expected time of relay of each data packet of the set to neighbouring nodes. Determining the mapping of the data packets of the set to the plurality of neighbouring nodes may include determining at least one of: a first sub-mapping which allocates any two data packets having a same source for relay to different subsets of the neighbouring nodes; and a second sub-mapping which assigns different expected times of relay to any two data packets that are generated at the node or received by the node from the one or more first nodes in a same time interval. The method may further include transmitting the data packets of the set to the plurality of neighbouring nodes according to the determined mapping.

In some implementations, determining the first sub-mapping may include, for each of the at least one generated data packet: identifying a predetermined number of first data packets of the first type that were previously generated by the node; obtaining a list of relay node sets associated with the first data packets, the relay node sets including neighbouring nodes to which the first data packets are respectively relayed; and selecting a first set of relay nodes based on identifying a set of neighbouring nodes that is different from the relay node sets in the obtained list.

In some implementations, selecting the first set of relay nodes may comprise arbitrarily selecting a set of two or more neighbouring nodes that is not included in the obtained list.

In some implementations, the selected first set of relay nodes may be different from relay node sets in the obtained list by at least two nodes.

In some implementations, a number of neighbouring nodes selected for inclusion in the first set may be arbitrarily determined.

In some implementations, a number of neighbouring nodes selected for inclusion in the first set may be bounded according to bandwidth requirements of the node.

In some implementations, determining the first sub-mapping may include, for each of the one or more first nodes: identifying a predetermined number of second data packets of the first type that were most recently received from the first node; and determining a first allocation of the second data packets to a fixed set of neighbouring nodes, the first allocation being selected from one or more allocations of the second data packets to neighbouring nodes that satisfy a predetermined condition.

In some implementations, an allocation of second data packets to the fixed set of neighbouring nodes may satisfy the predetermined condition if, for any two of the second data packets, a number of neighbouring nodes to which both said second data packets are allocated is less than or equal to a predefined threshold.

In some implementations, for any two of the first nodes, a set of all second data packets received from said two first nodes may be allocated to at least two different neighbouring nodes in the first allocation.

In some implementations, the method may further include determining a second allocation of the second data packets to the fixed set of neighbouring nodes, the second allocation being a re-arrangement of the first allocation for balancing traffic at output interfaces of the node.

In some implementations, determining the second sub-mapping may include, for each of one or more data packets of the set: determining a next scheduled time of relay of the data packet to neighbouring nodes; and relaying the data packet a predetermined amount of time after the next scheduled time of relay.

In some implementations, the predetermined amount of time may be a multiple of the first time period.

In some implementations, the method may further include setting a maximum number of data packets that can be received from each of the one or more first nodes.

The present application further describes a computing device to participate in a process for transmitting content for an entity to a blockchain, wherein the computing device is configured to carry out the operations of one or more of the methods described herein.

The present application further describes a non-transitory processor-readable medium storing processor-executable instructions to participate in a process for propagating data packets in a network of nodes, wherein the processor-executable instructions, when executed by a processor in one of a plurality of participating nodes, cause the processor to carry out the operations of one or more of the methods described herein.

The present application describes (preferably blockchain-based) solutions for providing node-level anonymization in a network. More particularly, the methods and systems described herein facilitate obfuscating the functions of nodes in a data propagation scheme within a network. Even if an attacker were to monitor inter-node traffic in a network or gain access to neighbouring nodes of specific nodes, the present methods make it challenging for such an attacker to determine whether a particular node is the source or a relaying node for data packets that are being propagated in the network. By obfuscating the functions/roles of nodes in a blockchain network, the efficacy of de-anonymization attacks on the network may be reduced and security of data transmission on or via the blockchain may be improved.

In many of the example implementations described herein, specific reference is made to blockchain transactions; however, it will be appreciated that the methods and devices described herein may be implemented and applied in connection with non-blockchain transactions propagation. More generally, the methods and devices described in the present disclosure may be suitable for use in propagating various different types of data among the nodes of a peer-to-peer network.

Any feature described in relation to one aspect or embodiment of the invention may also be used in respect of one or more other aspects/embodiments. These and other aspects of the present invention will be apparent from, and elucidated with reference to, the embodiments described herein. An embodiment of the present invention will now be described, by way of example only, and with reference to the accompanying drawings, in which:

FIG. 1 illustrates an example network associated with a blockchain.

FIG. 2 diagrammatically shows an example blockchain node with an input buffer and an output buffer.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

Figure 1:
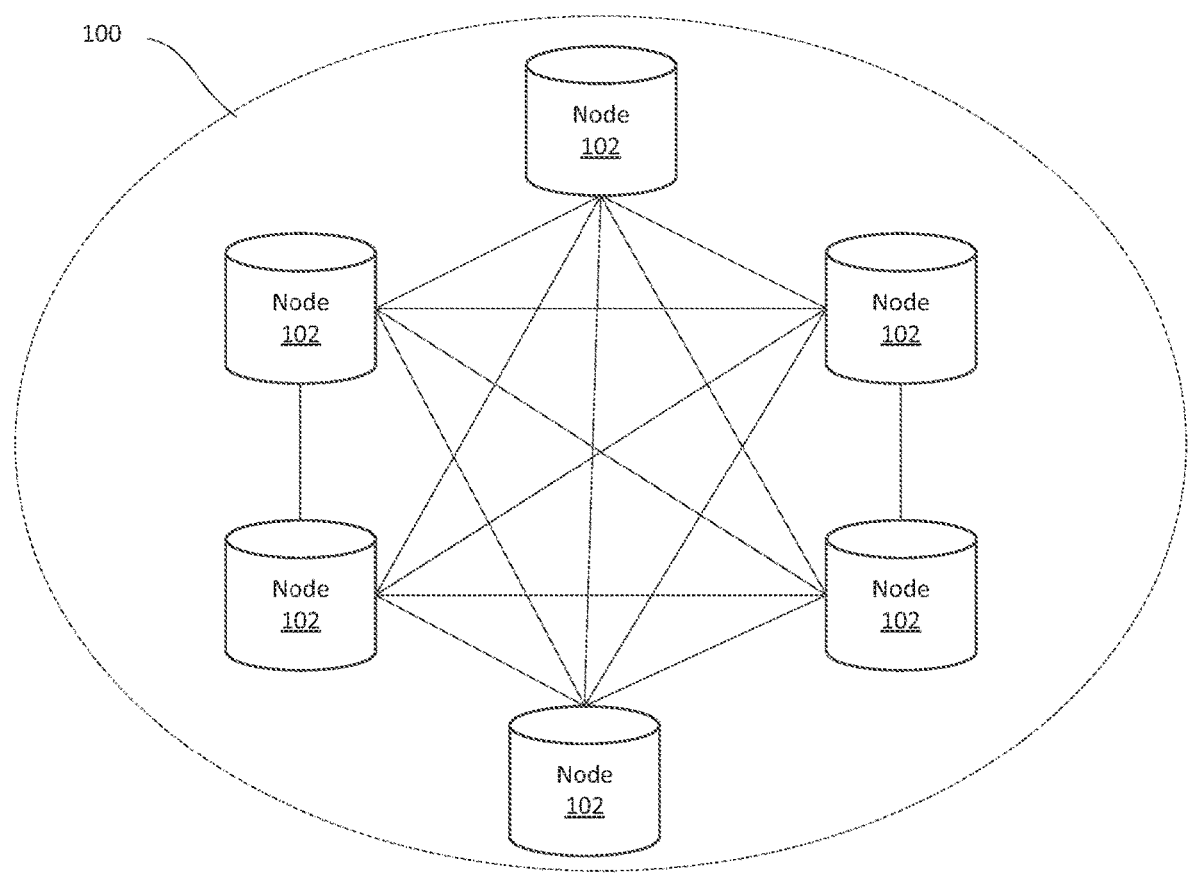

Reference will first be made to FIG. 1 which illustrates, in block diagram form, an example network associated with a blockchain, which may be referred to herein as a blockchain network 100. The blockchain network 100 is a peer-to-peer open membership network which may be joined by anyone, without invitation or without consent from other members. Distributed electronic devices running an instance of the blockchain protocol under which the blockchain network 100 operates may participate in the blockchain network 100. Such distributed electronic devices may be referred to as nodes 102. The blockchain protocol may be a Bitcoin protocol, or other cryptocurrency, for example.

The electronic devices that run the blockchain protocol and that form the nodes 102 of the blockchain network 100 may be of various types including, for example, computers such as desktop computers, laptop computers, tablet computers, servers, mobile devices such as smartphones, wearable computers such as smart watches or other electronic devices.

Nodes 102 of the blockchain network 100 are coupled to one another using suitable communication technologies which may include wired and wireless communication technologies. In many cases, the blockchain network 100 is implemented at least partly over the Internet, and some of the nodes 102 may be located in geographically dispersed locations.

Nodes 102 maintain a global ledger of all transactions on the blockchain, grouped into blocks, each of which contains a hash of the previous block in the chain. The global ledger is a distributed ledger and each node 102 may store a complete copy or a partial copy of the global ledger. Transactions by a node 102 affecting the global ledger are verified by other nodes 102 so that the validity of the global ledger is maintained. The details of implementing and operating a blockchain network, such as one using the Bitcoin protocol, will be appreciated by those ordinarily skilled in the art.

Each transaction typically has one or more inputs and one or more outputs. Scripts embedded into the inputs and outputs specify how and by whom the outputs of the transactions can be accessed. The output of a transaction may be an address to which value is transferred as a result of the transaction. That value is then associated with that output address as an unspent transaction output (UTXO). A subsequent transaction may then reference that address as an input in order to spend or disperse that value.

Nodes 102 can fulfil numerous different functions, from network routing to wallet services, to maintain a robust and secure decentralized public ledger. "Full nodes" contain a complete and up-to-date copy of the blockchain, and can therefore verify any transactions (spent or unspent) on the public ledger. "Lightweight nodes" (or SPV) maintain a subset of the blockchain and can verify transactions using a "simplified payment verification" technique. Lightweight nodes only download the headers of blocks, and not the transactions within each block. These nodes therefore rely on peers to verify their transactions. "Mining nodes", which can be full or lightweight nodes, are responsible for validating transactions and creating new blocks on the blockchain. "Wallet nodes", which are typically lightweight nodes, handle wallet services of users. Nodes 102 communicate with each other using a connection-oriented protocol, such as TCP/IP (Transmission Control Protocol).

When a node wishes to send a transaction to a peer, an "INVENTORY" message is sent to the peer, transmitting one or more inventory objects that is known to the transmitting node. If the peer replies with a "GETDATA" message, i.e. a full transaction request, the transaction is sent using a "TRANSACTION" message. The node receiving the transaction forwards it in the same manner—given that it is a valid transaction—to its peers.

Figure 2:
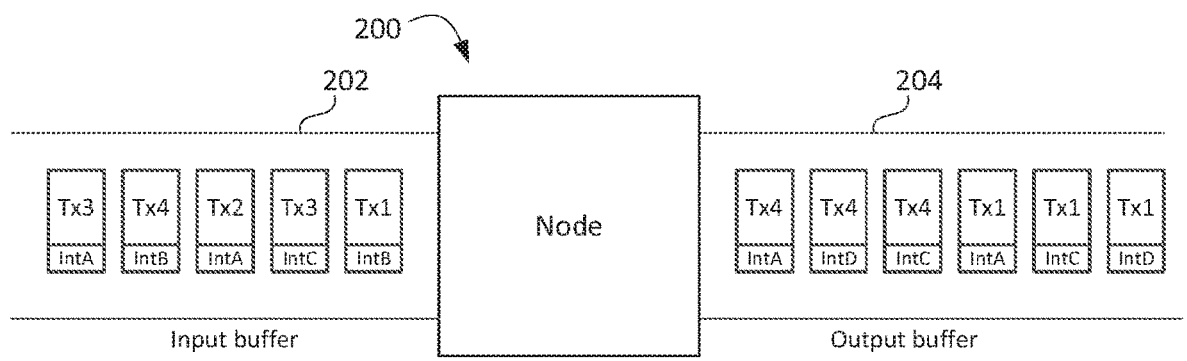

Reference is now made to FIG. 2, which diagrammatically shows an example node 200 with an input buffer 202 and an output buffer 204. The example node 200 has network interfaces with multiple peer nodes, referenced as intA, intB, intC, intD, etc. The input buffer 202 shows incoming transactions from the various peer nodes, and the output buffer 204 shows output network packets, corresponding to transactions, for transmission to peer nodes over the respective interfaces. Network packets are serially sent and received at an application-level according to the primitives provided by the operating system of the node 200. Assuming that a transaction x fits in a single Ethernet/IP packet, its transmission to m peers requires the buffering of m different output network packets. Both input and output network packets, along with other information, will contain a serialized transaction and a logical interface ID representing the TCP/IP connection to the sending/receiving peer.

Once a transaction is generated, the source node broadcasts the transaction message over the network. Generally, when a client generates a transaction, it is put in the output buffer 204. The transaction may or may not be forwarded immediately to the peers. In some implementations of node networks, transactions are propagated by a mechanism known as "diffusion propagation", whereby each transaction source transmits the transaction to its neighbours with an independent, exponential delay. The delays in propagation are random, and are useful to introduce uncertainty in timing estimates for a malicious attacker. Once a peer receives a certain transaction, the peer may not accept future relays of the same transaction; for example, the transaction hash may be stored in the peer's memory pool, allowing the peer to reject identical transactions. The "diffusion" of transactions through the network is symmetric, meaning that a forwarding node does not use information about the IP addresses of the neighbouring nodes to influence the transaction broadcast. For example, in "standard" diffusion processes, the peers of a broadcasting node all receive the same transaction and in each relay instance only one transaction at a time is relayed per peer. The symmetric nature of this "diffusion" may be exploited by malicious third parties having knowledge of the peer-to-peer graph structure of the network in conducting de-anonymizing attacks.

The present disclosure provides alternative techniques for transactions relay on blockchain networks, to improve protection against traffic analysis attacks. More particularly, the proposed relay protocols may be used to disguise, conceal or obfuscate connections between source nodes of transactions and their IP addresses.

A transactions relay protocol, Diffusion Mixer Protocol (DMP), is proposed. DMP includes two independent diffusion stages. The first stage ("random differential relay", or RDR) allows for relayed transactions mixing and obfuscation of transaction sources. During the random differential relay stage, each node waits a predefined amount of time before broadcasting a transaction to the network, to receive and collect a plurality of transactions from its peers. The node then creates outgoing connections to its "entry nodes", and sends to an arbitrarily (e.g. randomly) selected subset of these entry nodes different transactions with approximately the same timestamps. Entry nodes of a node are those neighbouring nodes to which direct outgoing connections can be established from the node. The randomness in the choice of entry nodes and the diversity in the relayed transactions may make the reconstruction of the network topology more difficult for an attacker.

The second stage ("standard diffusion") ensures a timely and reliable propagation of transactions within the network. In the standard diffusion stage, each node relays the same transaction to all its entry nodes, and in each relay instance only one transaction at a time is relayed per entry node.

It should be noted that in a network of nodes, such as a blockchain network, one or more of the nodes may be capable of implementing the DMP. Specifically, one or more of the nodes of the network may be able to relay its received data packets to its entry nodes by participating in the DMP. A participating node may, for example, select between an RDR process and a standard diffusion process, for propagating a particular data packet. The nodes of the network may elect to participate in the DMP, joining the protocol either via a decentralized manner or through inclusion in a group of participating nodes assembled by a central authority. A participating node relays its output network packets according to the DMP. In particular, if a participating node receives a data packet, the node may forward the received data packet according to a mode of propagation that is selected for that node, using the rules stipulated by the DMP.

The proposed DMP for transactions relay is described with reference to FIGS. 3 to 7. A schematic visualization of the DMP is provided in FIG. 3. An example blockchain network 300 of nodes is shown. Each node represents a network terminal (i.e., a blockchain node), while edges represent links between nodes. For the purposes of this illustration, it is supposed that for each link, it is possible to send or receive a single bit at a time.

In this example network 300, each node maintains a set of unconfirmed transactions so that when a node receives a new transaction, it is propagated through the network to all other nodes. Each node is to validate and store the new transactions in their respective local set and forward the new transactions to any peer nodes that do not yet have the new transactions. Due to the peer-to-peer nature of the blockchain network 300, all nodes do not receive a new transaction at the same time, meaning it will take some time for a new transaction to reach all nodes in the network 300.

Figure 3:
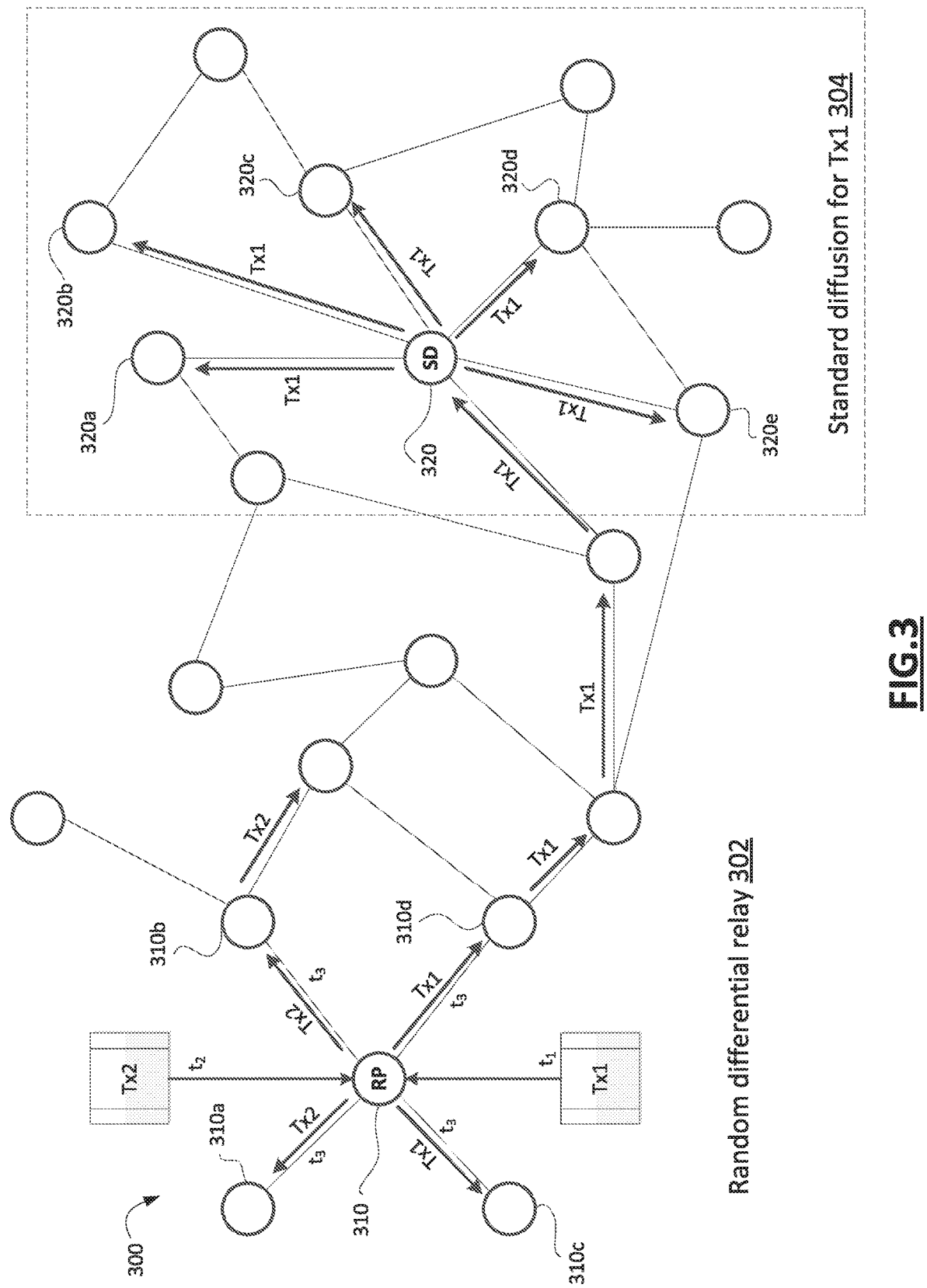
FIG. 3 is a schematic diagram of a protocol, Diffusion Mixer Protocol (DMP), for propagating a transaction in an example network of nodes.

FIG. 3 illustrates the two stages of the DMP for propagating a particular transaction Tx1, namely the random differential relay 302 and the standard diffusion 304 for Tx1. The source node 310 of transaction Tx1 may either generate the transaction Tx1 or receive it from a peer node, at a time, $t_1$. In accordance with the DMP, source node 310 waits to receive at least one more incoming transaction from its neighbouring nodes prior to initiating broadcast of the received/queued transactions. In the example of FIG. 3, once transaction Tx2 is received by source node 310 at time $t_2$, the transactions Tx1 and Tx2 are sent to an arbitrarily selected subset of the source node 310's entry nodes at time $t_3$. Transaction Tx1 is forwarded to entry nodes 310c and 310d, while transaction Tx2 is forwarded to entry nodes 310a and 310b. The example of FIG. 3 is only illustrative; in particular, the source node 310 may wait to receive more than two incoming transactions before propagating any of its received transactions.

The entry nodes relay the received transactions to their own peers. For example, nodes 310b and 310d forward transactions Tx2 and Tx1, respectively, to one or more of their neighbouring nodes. In the DMP, each recipient of a transaction independently selects a mode of propagating the received transaction. Node 320 is an example of a node which selects standard diffusion as its diffusion mode. As shown in FIG. 3, node 320 forwards the same transaction, Tx1, to all its entry nodes, namely 320a, 320b, 320c, 320d, and 320e.

Figure 5:
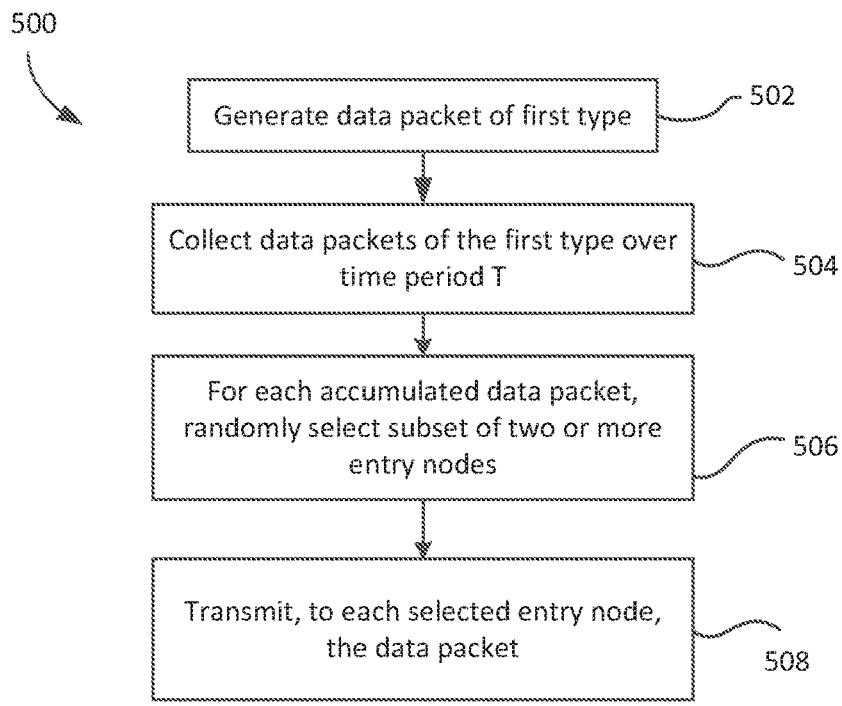
FIG. 5 shows, in flowchart form, an example process for propagating data packets in a blockchain network, in accordance with the DMP.

Reference is now made to FIG. 5, which shows, in flowchart form, an example method 500 for propagating data packets in a network, in the RDR stage of DMP. The method 500 is implemented by a node of, for example, a blockchain network, such as network 100. A node may be understood, in this context, to refer to a mining node, full node, validator node, or other type of discrete blockchain node in the blockchain network. The node is a computing device with network connection(s), computing resources, and executing software implementing the blockchain protocol.

In operation 502, the client associated with the node generates at least one data packet of a first type. In the context of a blockchain network, the data packet of a first type may comprise a blockchain transaction. That is, the client may generate a blockchain transaction which is to be propagated to the other nodes of the network.

In operation 504, the node collects a set of data packets of the first type during a first time period, T. That is, the node accumulates data packets of the first type over a period of time. The set includes the at least one generated data packet and at least one data packet of the first type that is received from one or more peer nodes in the network. In this way, the data packets generated by the node are mixed with those data packets of the same type that are received from neighbouring nodes. In a blockchain network, during the time period T, the node accumulates a set of transactions by monitoring the network for incoming transactions to be relayed. The length of time period T may be predefined. In some example implementations, the length of time may vary based on parameters such as average connection times, average number of transactions received per unit of time, or the node's centrality (i.e. the number of incoming connections to the node) within the network. During the time period T, the node may only be permitted to accumulate data packets of the first type, and therefore may be prevented from transmitting any data packets of the first type for the duration of time period T.

In operation 506, the node arbitrarily selects a subset of its entry nodes to which different sets of the collected data packets will be forwarded. More specifically, for each data packet in the set of collected data packets, the node arbitrarily selects two or more of its entry nodes (i.e. neighbouring nodes, with which the node has outgoing connections), and assigns the data packet to the selected entry nodes. For example, the entry nodes may be selected randomly. The node may, in some implementations, query the network to obtain fresh addresses of its peers. For example, in the Bitcoin network, the node may query one or more database source names (DSN) embedded in Bitcoin Core, BitcoinJ, or other blockchain protocol, and maintained by Bitcoin (or other blockchain) community members. As a response, the node will get one or more DSN records showing the IP addresses of available full nodes which may accept incoming connections. A decentralized version of peer discovery may be implemented by having peers send "ADDR" messages containing their IP addresses and port numbers to a new node that joins the network.

Figure 4:
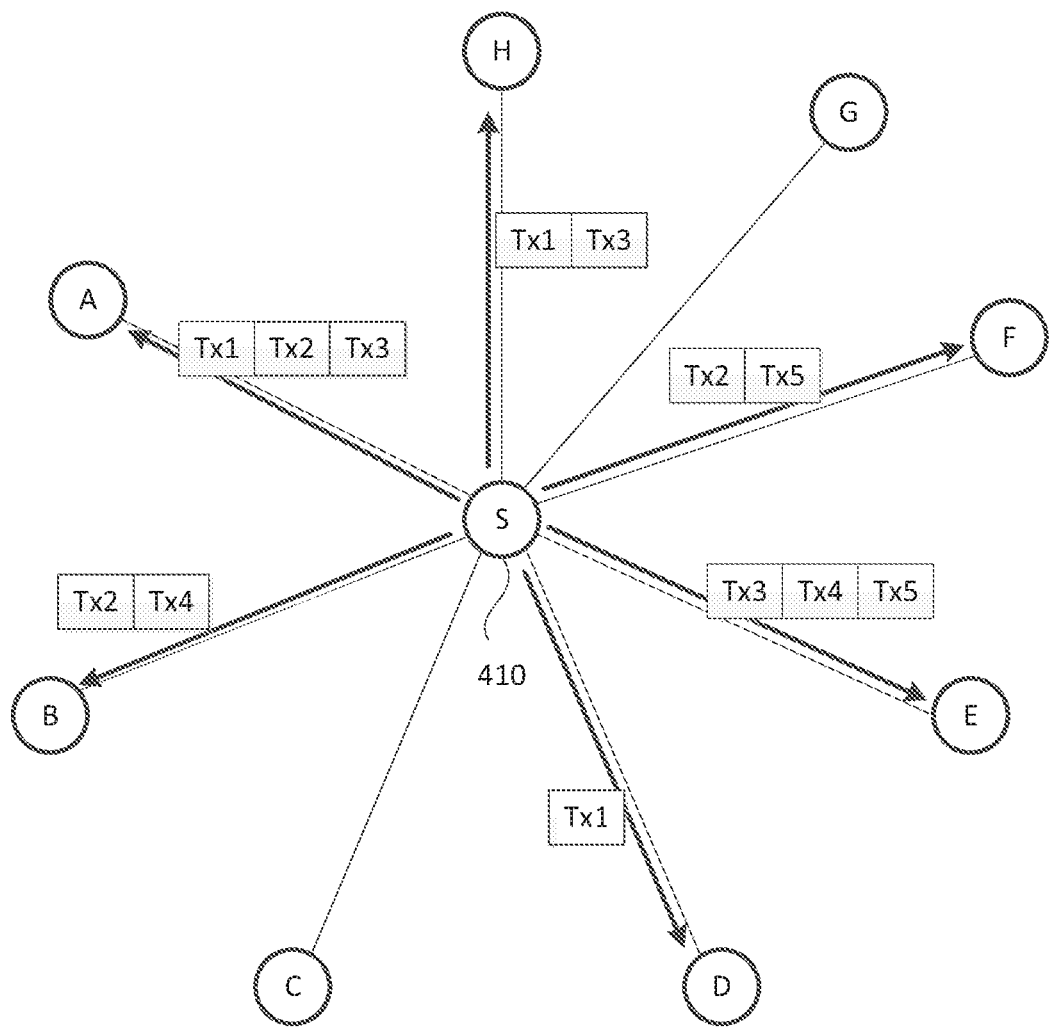
FIG. 4 illustrates an example of a relay of transactions in a network of nodes, in accordance with the DMP.

In some implementations, as part of operation 506, one or more of the nodes in a network may maintain a table or other data structure tracking its assignment of each collected data packet to an entry node that the data packet should be relayed to. FIG. 4 shows an example of transactions relay for source node 410 in the RDR stage of the DMP in a blockchain network. Table 1 is an example assignment of the collected transactions, Tx1-Tx5, to the entry nodes of source node 410. The entry nodes are indicated as nodes A, B, C, D, E, F, G, and H. As shown in FIG. 4 and Table 1, the source node 410 relays each transaction to at least two entry nodes, and multiple transactions can be relayed via the same node. For example, transactions Tx3, Tx4, and Tx5 are all simultaneously relayed via entry node E. More generally, in the RDR process, multiple data packets can be simultaneously relayed to the same peer node by a forwarding node. Not all entry nodes receive transactions from source node 410 in a given instance of the DMP. In the example of Table 1, entry nodes C and G do not receive any transactions from source node 410.

TABLE 1

| Transactions/Nodes | Relay 1 | Relay 2 | Relay 3 |
|---|---|---|---|
| Tx1 | Node A | Node D | Node H |
| Tx2 | Node E | Node B | Node F |
| Tx3 | Node E | Node A | Node H |
| Tx4 | Node B | Node E | |
| Tx5 | Node E | Node F | |

Referring again to FIG. 5, for each collected data packet, in operation 508, the node transmits the data packet to each of the (arbitrarily or randomly) selected entry nodes. Each selected entry node is configured to relay the data packet to one or more second nodes (e.g. peers of the entry node) in the network using a mode of data propagation that is randomly selected for that entry node. That is, each selected entry node forwards the received data packet to one or more of its own peers using a propagation mode that is independently chosen for that entry node. In the example transactions relay of FIG. 4, each of transactions Tx1-Tx5 is forwarded to the entry nodes to which the transaction is assigned.

Each node receiving a transaction from source node 410 then randomly selects a mode of propagation/diffusion to use in forwarding the received transaction to one or more of its peer nodes (if any). In particular, an entry node that receives a transaction selects, on a random basis, between relaying the transaction according to the standard diffusion process or the RDR process. The choice between the two options is random. Thus, in the DMP, the two diffusion processes alternate probabilistically, i.e. there is not a clear separation between the RDR stage and the standard diffusion stage. As a result of this "mixing" of diffusion processes, it becomes more difficult for an attacker to reconstruct a topology of the network based on identifying a separation between the sets of nodes relaying via random data propagation or via standard diffusion.

In some implementations, the random selection by an entry node of the diffusion mode may involve receiving, from the source node, a message in addition to the relayed data packet. The entry node may then generate a random value (e.g. random number), append it to the received message, and hash the result, for example, using SHA-256. The entry node can then check the hash value and subsequently obtain the diffusion mode based on predetermined rules regarding the hash value (e.g. if the final character of the hash is a digit, select the RDR as mode of diffusion). Alternatively or additionally, the selection of the diffusion mode can be done using any randomized process (e.g. random number generator), where the probability of selecting one of the modes may be greater than that of selecting the other of the modes, depending on factors such as number of incoming and/or outgoing connections, average number of data packets received per unit of time, etc.

In propagating a particular data packet, it may be desirable to balance the level of anonymity protection for the propagating nodes with the overall speed of propagation. If the measures to ensure a certain level of anonymity are too cumbersome (e.g. requires too many network resources, nodes of the network are intentionally underutilized in relaying data packets, etc.), the efficacy of the network in timely spreading data may be impaired. Accordingly, in some implementations, the random selection of the mode of propagation by a relaying node may be weighted. In particular, different probabilities may be assigned to each of the two or more modes of propagation (i.e. RDR, standard diffusion, etc.) so that the probabilities reflect the proportional significance of anonymity and speed of data propagation. For example, in some instances, a higher predefined probability may be associated with the RDR mode for the nodes of a particular network, reflecting a proportionally greater emphasis on preserving anonymity of the propagated data.

Figure 6:
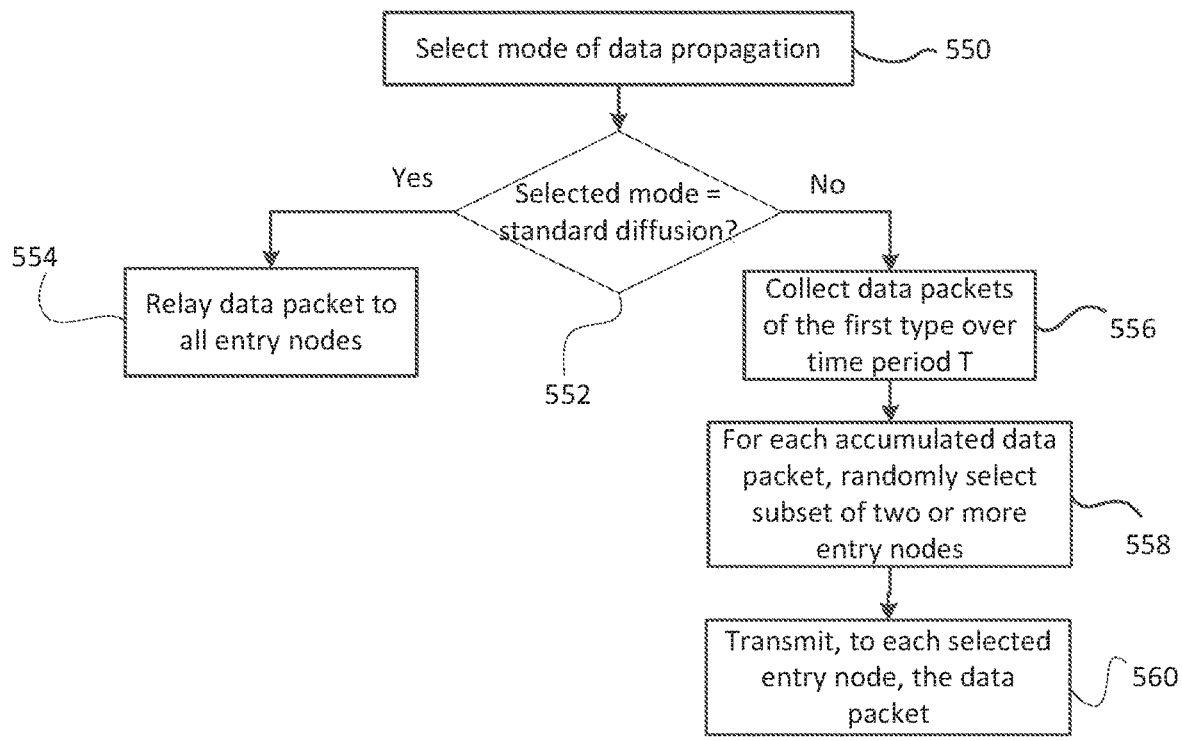
FIG. 6 shows, in flowchart form, another example process for propagating data packets in a blockchain network, in accordance with the DMP.

The method 500 of FIG. 5 is implemented by a node which generates its own data packet of a first type. In particular, a node that participates in the DMP and generates a data packet for propagation to the rest of the network performs the method 500. FIG. 6 shows an example process performed by a relay node, or a node which forwards or relays a data packet that is generated by a different node. That is, a relay node is a node that does not itself generate data to transfer during the relay of a specific data packet, instead serving the function of "relaying" the data packet. In operation 550, the relay node independently selects its own mode of data propagation. A relay node may, for example, select between a RDR mode and standard diffusion mode. If the standard diffusion mode is selected (which may be determined at operation 552), the relay node forwards the data packet to all of its entry nodes in operation 554. In the example of FIG. 6, the selection of propagation mode is between two possible options; this example is not limiting and in other examples, there may be three or more possible modes of propagation. If, in the method 500 the selected mode is RDR (which may be determined at operation 552), the relay node performs the steps 556, 558 and 560 which correspond to the operations 504, 506 and 508 of FIG. 5.

Figure 7:
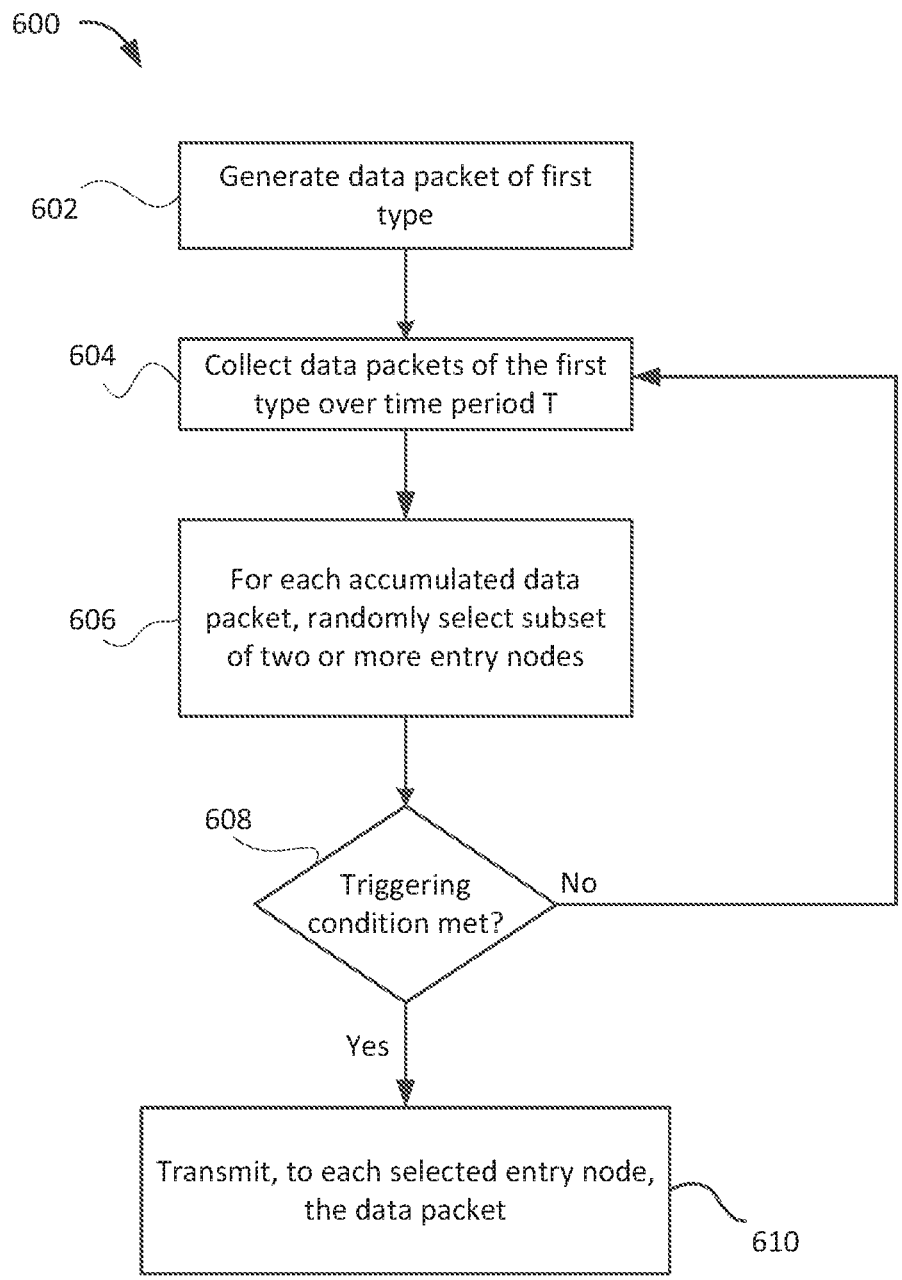
FIG. 7 shows, in flowchart form, another example process for propagating data packets in a blockchain network, in accordance with the DMP.

Reference will now be made to FIG. 7, which shows, in flowchart form, an example process 600 for propagating data packets in a network. The process 600 may be implemented at a blockchain node having a plurality of incoming and outgoing connections to other nodes of a blockchain network.

Operations 602, 604, 606 and 610 of process 600 correspond to operations 502, 504, 506 and 508 of method 500, respectively. In operation 608, the node determines whether a triggering condition has been met, prior to transmitting a collected data packet to its assigned entry node in operation 610. In particular, the transmitting of the data packet is performed in response to detecting that a suitable triggering condition has been satisfied. When the triggering condition has not been met, the node continues to collect data packets of the first type without relaying any of said data packets to its entry/peer nodes.

A triggering condition may be employed to direct the node to collect a sufficient number of incoming data packets and/or to collect incoming data packets for a sufficient amount of time. For example, sufficiency may be determined based on a defined threshold. By collecting a plurality of incoming data packets prior to, for example, simultaneously propagating them to peer nodes in the network, an attacker that monitors the relay traffic originating from the node may not be able to easily identify the node as the correct source of the relayed data packets.

In some implementations, the triggering condition may be the expiry of a predetermined duration since the time of generation of the at least one data packet of the first type by the node in operation 602. That is, the node may be designed to monitor and collect incoming data packets (e.g. transactions) for a predetermined period of time that begins when the node generates a data packet of the same type, before any of said data packets are propagated by the node. This condition may be useful in trying to ensure that a data packet that is generated by the node is propagated after having collected more data packets of the same type that can be simultaneously broadcasted, thereby rendering it difficult for an attacker to correctly identify the node as the source of the generated data packet.

In some implementations, the triggering condition may be the expiry of a predetermined duration since the time of receipt of a first of the at least one incoming data packet of the first type from the node's peers. That is, the node may be designed to monitor and collect incoming data packets for a predetermined period of time that begins when a first of such incoming data packets is received. This condition may be useful in trying to ensure that more data packets, either data packets generated by the node itself or received from other peers, are collected by the node prior to any broadcast to the rest of the network.

In some implementations, the triggering condition may be the number of collected data packets during the first time period reaching a threshold number. In particular, the node may be designed to monitor and collect incoming data packets until the earlier of the expiry of the first time period or a predetermined threshold number of data packets being collected by the node.

Heuristics for Random Differential Relay

As described above, random differential relay represents a departure from the "standard diffusion" protocol for propagating transactions in a network of nodes. In implementing RDR, a propagating node relays different transactions simultaneously to a randomly selected subset of entry nodes. The propagating node may create a data structure, such as the data structure illustrated in Table 1, by randomly assigning to each collected transaction one or more entry nodes that the transaction should be relayed to. More generally, a network node that relays data packets to its peers may maintain its own internal routing data structures which specify the type of relay to perform for each of a plurality of data packets collected (i.e. received or locally generated) by the node.

In the context of the Diffusion Mixer Protocol proposed herein, each node in the blockchain network that implements RDR may build its own routing data structure, or "RDR table", independently. An RDR table defines a transaction allocation scheme for each node that adopts the RDR protocol. That is, an individual node's RDR table is used to manage what transactions are to be relayed to which peer and when. The RDR table may keep track of all the transactions received or generated in a given amount of time, $\Delta T_{RDR}$, as well as the source peers of transactions. An RDR table may include additional information, such as: time of arrival of the first instance of a transaction ("ToA timestamp"); times chosen for relaying a transaction ("ToR timestamp"); and/or counter of the number of instances of the same transaction received by the node. An example RDR table is provided below.

TABLE 2

| Transaction ID | Sources | Destinations | Data |
| --- | --- | --- | --- |
| $tx_1$ | a, b, d | c, e | ... |
| $tx_2$ | [local] | a, c, e | ... |
| $tx_3$ | d, e | a, b | ... |

A node's local RDR table may be updated dynamically (i.e. in real-time) as new information (timeouts, transactions received or generated) becomes available. The present disclosure provides various heuristics, or "sub-systems", which contribute to the building and updating of individual RDR tables. These sub-systems can be considered as sets of rules or guidelines which may be applied to update transaction allocations as specified in RDR tables. The strategies encompassed by these sub-systems may be useful in enhancing transaction source obfuscation and balancing network traffic generated by the relay operations of an individual node. The proposed set of sub-systems, namely source mixing, relay mixing, destination mixing, time-of-arrival mixing, and source control, may work in parallel, while a load balancing module can be used to merge the transaction relay information collected and provide an optimized allocation of network resources.

Figure 8:
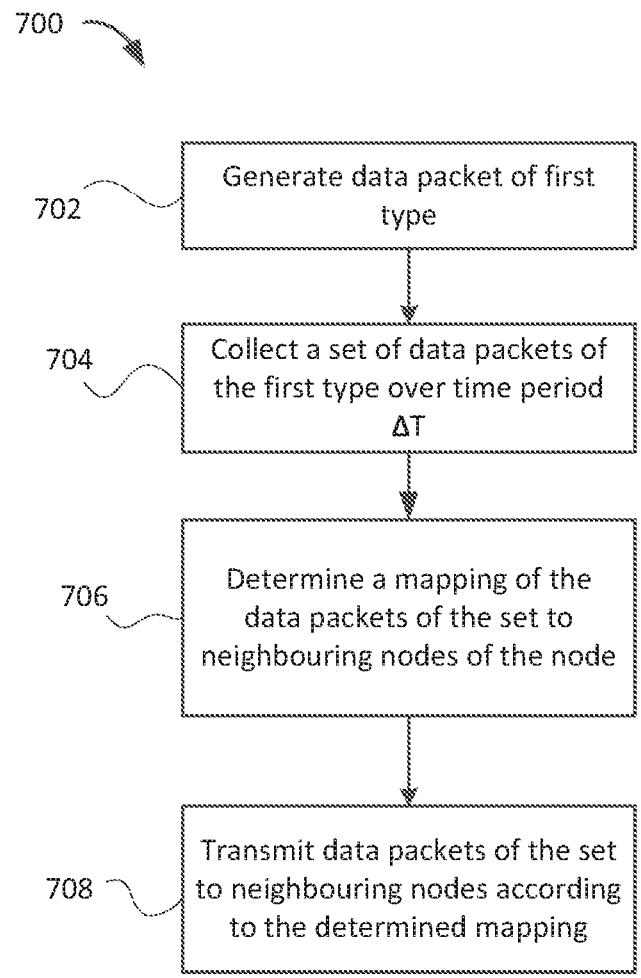
FIG. 8 shows, in flowchart form, an example process for transmitting data packets generated or received at a node in a blockchain network.

Reference is now made to FIG. 8, which shows in flowchart form, an example method 700 for transmitting data packets that are either generated or received at a node in a network. The method 700 represents a technique of propagating data in a network according to a transaction allocation scheme that complies with the rules of at least one of the proposed sub-systems/heuristics. The method 700 is implemented by a node of, for example, a blockchain network, such as network 100 of FIG. 1. More specifically, the method 700 is performed by a node that participates in the DMP and is configured to generate or receive data packets of a first type (e.g. transactions) for propagation to the rest of the network.

In operation 702, the client associated with the node generates at least one data packet of a first type. The data packet may, for example, comprise a blockchain transaction.

In operation 704, the node collects a set of data packets of the first type during a first time period, T. That is, the node accumulates data packets of the first type over a period of time. The set includes the at least one generated data packet and at least one data packet of the first type that is received from one or more peer nodes in the network. In this way, the data packets generated by the node are mixed with those data packets of the same type that are received from neighbouring nodes.

In operation 706, a mapping of the data packets of the collected set to a plurality of neighbouring nodes connected to the node is determined. The mapping indicates an expected time of relay of each data packet of the set to the neighbouring nodes. This "mapping" is used to construct the individual local RDR tables for nodes of the network. One or more of the sub-systems/heuristics described in the present disclosure may contribute (in parallel or independently) to construction of the RDR tables. In particular, one or more different sub-mappings may be applied in determining the mapping of the collected data packets to neighbouring nodes. The sub-mappings may be of at least two different types. A first type of sub-mapping allocates any two data packets having a same source (i.e. originating node) for relay to different subsets of the neighbouring nodes. The "source mixing" and "relay mixing" sub-systems described in greater detail below are examples of this first type of sub-mapping. A second type of sub-mapping assigns different expected times of relay to any two data packets that are generated at the node or received by the node from peer nodes in a same time interval. The "time-of-arrival mixing" sub-system is an example of this second type of sub-mapping.

In operation 708, once the mapping of the data packets of the collected set to neighbouring nodes is determined, said data packets are transmitted to neighbouring nodes in accordance with the determined mapping.

It will be understood that the individual sub-systems may be independently implemented to update the transaction allocations defined in an RDR table. That is, each sub-system can be adopted separately for an RDR table, independently of the other sub-systems. Accordingly, the individual sub-systems may provide different ways of allocating transactions to relay nodes and, consequently, different techniques for propagating transactions.

Source Mixing

The principle underlying the source mixing sub-system is that transactions generated locally at a node should be transmitted to non-overlapping subsets of peers. By way of illustration, if node x generates two transactions $tx_i$ and $tx_{i+1}$, the sets of peers selected for relay of those transactions, denoted $S(tx_i)$ and $S(tx_{i+1})$, respectively, satisfy $$S(tx_i) \neq S(tx_{i+1})$$

That is, the sets of peers for two subsequent transactions differ by at least one peer. This inequality can help to complicate any malicious search for patterns for the initial relay of transactions generated at a node. This concept can be extended to a source mixing of degree $\delta^{SM}$ as follows:

$$S(tx_{i+a}) \neq S(tx_{i+b}), \forall (a,b) \in [0, \delta^{SM}-1], a \neq b$$

Figure 9:
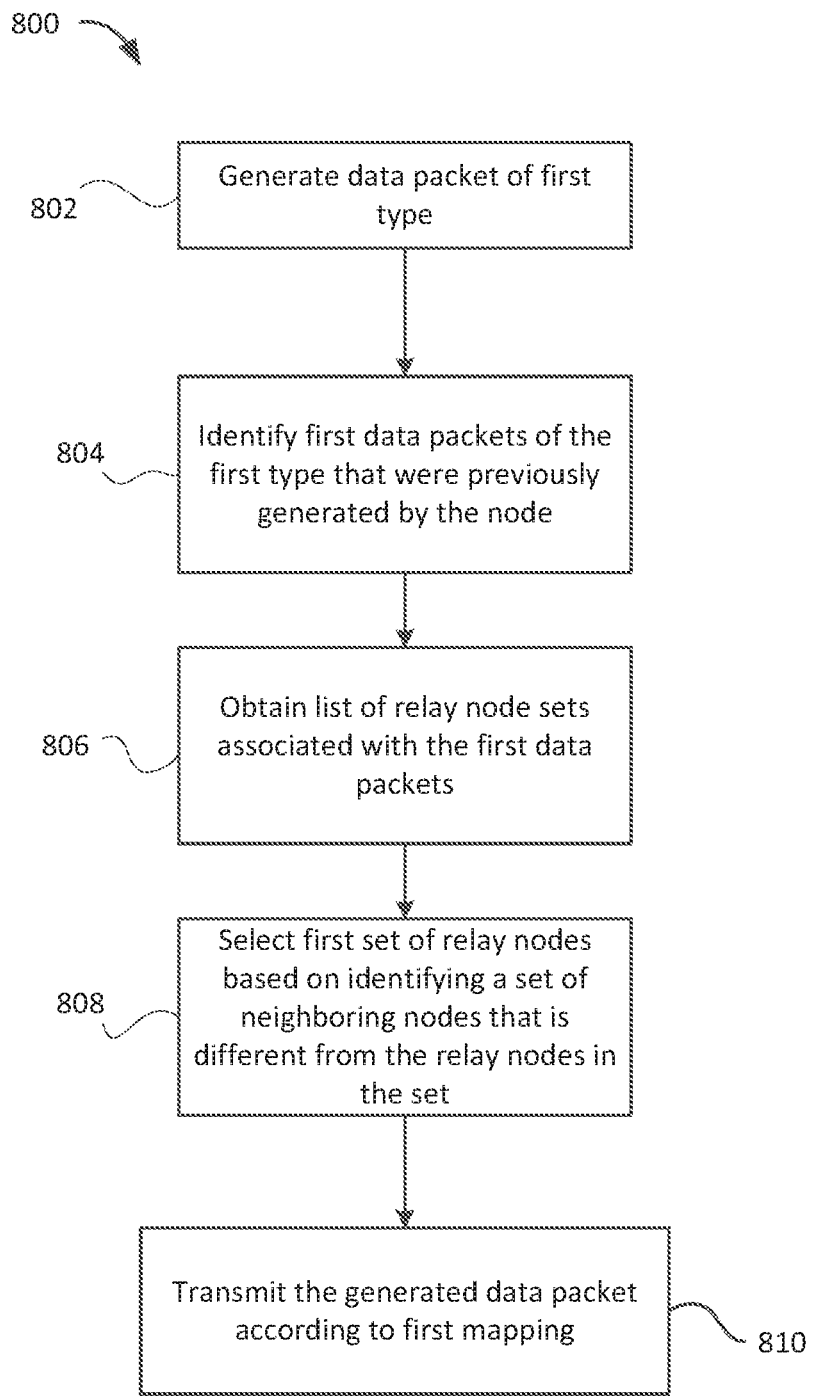
FIG. 9 shows, in flowchart form, an example process for transmitting data packets generated at a node in a blockchain network.

Reference is now made to FIG. 9, which shows in flowchart form, an example method 800 for transmitting data packets generated at a node in a network. The method 800 represents a technique of propagating data in a network according to a transaction allocation scheme that complies with the rules of a source mixing sub-system/heuristic. The method 800 is implemented by a node of, for example, a blockchain network, such as network 100 of FIG. 1. More specifically, the method 800 is performed by a node that participates in the DMP and generates data packets of a first type (e.g. transactions) for propagation to the rest of the network.

In operation 802, the client associated with the node generates at least one data packet of a first type. The data packet may, for example, comprise a blockchain transaction.

The node determines a first mapping of the at least one generated data packet to its neighbouring nodes (i.e. peers). In particular, a plurality of subsets of peers are selected for relaying the data packets that are generated at the node. Each data packet is associated with a specific subset of relay nodes by the first mapping. For each data packet, in operation 804, a predetermined number of first data packets of the first type that were previously generated by the node are identified. These may be data packets which have already been transmitted to peers by the node, or data packets which were previously generated but have yet to be relayed to the node's peers.

In operation 806, a list of relay node sets associated with the first data packets is obtained. The relay node sets comprise those neighbouring nodes (peers) to which the first data packets are respectively relayed (or allocated for relaying). That is, the relay node sets indicate the subsets of peers of the node to which individual ones of the first data packets are allocated.

In operation 808, a first set of relay nodes is selected based on identifying a set of neighbouring nodes that is different from the relay node sets in the list obtained in operation 806. For example, the first set of relay nodes may be chosen by arbitrarily selecting a set of two or more neighbouring nodes that is not included in the obtained list of relay node sets. In some implementations, a requirement may be imposed that the selected first set be different from the relay node sets in the obtained list by two or more peers. That is, an upper limit may be set on the number of elements belonging to the intersecting set between the selected first set of relay nodes and any one of the relay node sets in the obtained list.

The method 800 may be performed by a node after a single data packet is generated at the node, or after the node collects a plurality of generated data packets. In particular, the node may generate and accumulate data packets of a first type over a period of time (similar to the RDR stage of DMP) and determine a first mapping of the accumulated data packets to relay node sets. In these cases, the data packets may be respectively allocated to arbitrarily selected subsets of relay nodes, ensuring that no two such subsets are equal to each other.

The number of neighbouring nodes that are selected for inclusion in the first set of relay nodes may be arbitrarily determined. In at least some implementations, the number of peers selected for the first set is bounded according to the bandwidth requirements (e.g. cumulative amount of incoming and outgoing data within fixed timeframes) of the propagating node. In particular, the number of peers selected for relay of locally generated transactions may be adjusted in order to address network load issues or to improve source obfuscation. For example, the number of peers included in the first set may be defined by $$m(tx_i) = m^{SM} \pm rnd(\xi^{SM})$$

where $m^{SM}$ is a nominal value representing the average number of peers selected for relay in source mixing sub-system and $rnd(\xi^{SM})$ represents a random integer number between 0 and $\xi^{SM}-1$.

The selection of the first set of relay nodes can then be set in the first mapping in association with the respective data packet. In other words, the first mapping may indicate that the data packet is associated with (i.e. allocated to) the first set of relay nodes. In operation 810, the data packet is transmitted according to the determined first mapping.

Relay Mixing

The relay mixing sub-system is premised on the concept that transactions received by a node should be relayed to non-overlapping subsets of the node's peers. Using the parameter λ to represent the number of elements belonging to the intersecting set between the relaying peers selected for two different transactions received by the same node, the idea behind relay mixing can be captured by $$|S(tx_{j+a}) \cap S(tx_{j+b})| \leq \lambda \ \forall (a,b) \in [0, \delta^{RM}-1], a \neq b \quad (1)$$

where $\delta^{RM}$ is the degree of relay mixing. The inequality (1) defines a transaction allocation problem of finding allocations of transactions to relay nodes that satisfy the inequality. The relay mixing strategy can thus be controlled by varying the parameter λ in (1). Once λ is set, an iterative search for a suboptimal solution to the transaction allocation problem is performed. The relay mixing sub-system may require that the inequality (1) be satisfied for each peer $p_i$ from which the node receives one or more transactions. For example, the last $\delta^{RM}$ transactions received $(tx_j, tx_{j+1}, \ldots, tx_{j+\delta^{RM}-1})$ from peer $p_i$ may be used to implement the relay mixing by requiring inequality (1) to be satisfied for those transactions. Accordingly, in some implementations, an individual parameter $\lambda_i$ may be defined for each peer $p_i$, respectively. In this way, source obfuscation may be implemented by creating an independent data structure for transaction relay for each peer $p_1, p_2, \ldots, p_m$ from which the node receives transactions, identifying allocations of the received transactions to relay nodes.

Alternatively, in other implementations, the parameter λ may be a unique system parameter; a time-varying parameter $\lambda^t$ updated using a specific time window and information stored in the RDR table; or a time-varying parameter $\lambda_i^t$ for each peer and updated using a specific time window and information stored in the RDR table.

The number of combinations of transaction allocations for a generic peer is $$C = \binom{m}{x}^{\delta^{RM}},$$

where m is the number of peers of the node, $\delta^{RM}$ is the degree of relay mixing, and x is an average number of peers selected for relay. The iterative search for a suboptimal solution may proceed in several possible ways:

- Set a maximum number of iterations and select the transaction allocation with the smallest number of intersecting peers
- Set a maximum number of iterations but interrupt the process earlier if a given threshold of intersecting peers is reached
- Set a maximum number of iterations and increase the value of λ if the requirements are not met, then restart the process
- Set a maximum number of iterations and modify the value of m if the requirements are not met, then restart the process
- Set a maximum number of iterations and reduce the value of m if the requirements are not met, then restart the process Another set of approaches can be considered if the maximum number of iterations is substituted with a fixed time window $\Delta T_{RM}$.

The number of neighbouring nodes that are selected for inclusion in the set of relay nodes may be arbitrarily determined. In at least some implementations, the number of peers selected for the set is bounded according to the bandwidth requirements (e.g. cumulative amount of incoming and outgoing data within fixed timeframes) of the propagating node. In particular, the number of peers selected for relay of locally generated transactions may be adjusted in order to address network load issues or to improve source obfuscation. For example, the number of peers included in the first set may be defined by $$m(tx_i) = m^{RM} \pm rnd(\xi^{RM})$$

where $m^{RM}$ is a nominal value representing the average number of peers selected for relay in relay mixing sub-system and $rnd(\xi^{RM})$ represents a random integer number between 0 and $\xi^{RM}-1$. In some embodiments, $\xi^{RM}$ and $\xi^{RM}$ may have the same value.

Figure 10:
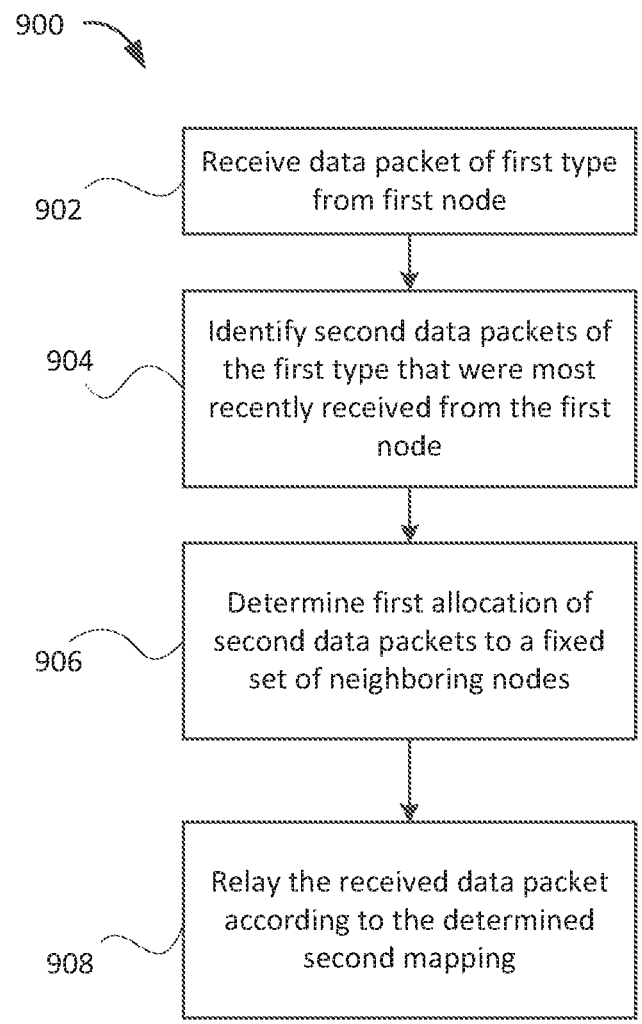
FIG. 10 shows, in flowchart form, an example process for relaying data packets received at a node in a blockchain network.

Reference is now made to FIG. 10, which shows in flowchart form, an example method 900 for relaying data packets received at a node in a network. The method 900 represents a technique of propagating data in a network according to a transaction allocation scheme that complies with the rules of a relay mixing sub-system/heuristic. The method 900 is implemented by a node of, for example, a blockchain network, such as network 100 of FIG. 1. More specifically, the method 900 is performed by a node that participates in the DMP and receives data packets of a first type (e.g. transactions) for propagation to the rest of the network.

In operation 902, the client associated with the node receives at least one data packet of a first type. The data packet may, for example, comprise a blockchain transaction.

The node determines a second mapping of the at least one received data packet to its neighbouring nodes (i.e. peers). In particular, a plurality of subsets of peers are selected for relaying the data packets that are generated at the node. Each data packet is associated with a specific subset of relay nodes by the second mapping. For each data packet, in operation 904, a predetermined number of second data packets of the first type that were most recently received by the node are identified. These may be data packets which have already been transmitted to peers by the node, or data packets which were previously received but have yet to be relayed to the node's peers.

In operation 906, a first allocation of the second data packets to a fixed set of neighbouring nodes is determined. In particular, the first allocation is selected from one or more allocations of the second data packets to neighbouring nodes that satisfy a predetermined condition. This operation corresponds to the iterative search for a suboptimal solution to inequality (1) described above. That is, of the allocations of data packets to relay nodes that satisfy (1), a unique allocation (e.g. an allocation with fewest intersecting peers) is determined. As captured by (1), an allocation of second data packets to a fixed set of neighbouring nodes satisfies a predetermined condition if, for any two of the second data packets, a number of neighbouring nodes to which both said second data packets are allocated (for relaying) is less than or equal to a predefined threshold value.

The unique allocation of the second data packets to neighbouring nodes identified in operation 906 can then be set in the second mapping. In other words, the second mapping may indicate the relay nodes to which the second data packets (i.e. data packets received by the node from its peers) are respectively allocated. In operation 908, the at least one received data packet is relayed according to the determined second mapping.

The method 900 may be performed by a node after a single data packet is received at the node, or after the node collects a plurality of received data packets. In particular, the node may receive and accumulate data packets of a first type over a period of time (similar to the RDR stage of DMP) and determine a mapping of the accumulated data packets to relay node sets. In these cases, the data packets may be respectively allocated to arbitrarily selected subsets of relay nodes, ensuring that no two such subsets are equal to each other.

Destination Mixing

Figure 11:
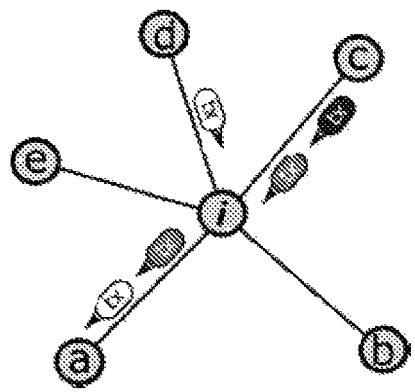
FIG. 11 illustrates an example of destination mixing in the propagation of data packets in a network of nodes.

The destination mixing heuristic captures the idea that an outbound connection of a node should carry out transactions relayed by different peers. This heuristic may be considered as a special case of the relay mixing sub-system, since the latter involves the creation of non-overlapping subsets of peers for relay from the same source peers. In method 900, destination mixing may be implemented by ensuring that, at operation 906, for any two of the first nodes (i.e. nodes from which the node receives data packets), the set of all second data packets received from said two first nodes is allocated to at least two different neighbouring nodes in the first allocation. For example, FIG. 11 illustrates an example of destination mixing for a node i. The destination mixing sub-system ensures that node a does not receive, in a given time window $\Delta T_{DM}$ two transactions relayed by the same node c. Thus, only one of the two transactions received at node i from node c is relayed to node a.

In some implementations, the destination mixing may be enabled on a different subset of peers for each time window $\Delta T_{DM}$. For example, the subsets may be allocated in a similar way to the one described for source mixing with parameters ($m^{DM}$, $\delta^{DM}$, $\xi^{DM}$). This strategy may contribute to de-correlation of source and destination for a given transaction.

Time-of-Arrival Mixing

Figure 12:
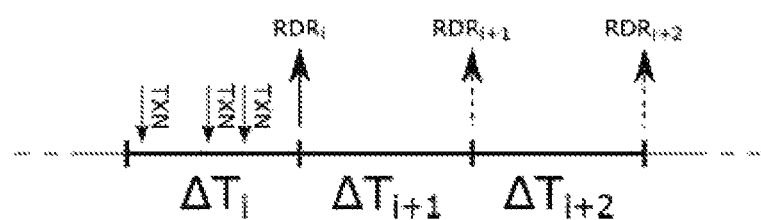
FIG. 12 illustrates an example of a delayed relay of data packets in a network of nodes.

The time-of-arrival mixing heuristic implements a delayed relay of data packets, in order to help de-correlate source and destination information about a data packet relay. For example, data packets (e.g. transactions) that are collected (or generated) within a time window $\Delta T_i$ (e.g. in RDR stage of DMP) may be scheduled for relay at the end of $\Delta T_i$ ($RDR_i$ in FIG. 12). The time-of-arrival mixing sub-system delays the relay past $RDR_i$. In some implementations, the relay of data packets may be delayed by a multiple $q\Delta T_i$, e.g. $RDR_i$, $RDR_{i+1}$, $RDR_{i+2}$, etc. Thus, in accordance with the time-of-arrival heuristic, relaying a received (or generated) data packet by a node includes determining a next scheduled time for relay of received data packets to neighbouring nodes and relaying the data packet a predetermined amount of time after the next scheduled time for relay. All transactions collected within $\Delta T_i$ may be relayed at $\Delta T_i + q\Delta T$, or each transaction j collected within $\Delta T_i$ may be relayed at a given $\Delta T_i + q_j \Delta T$.

The random variable q may, in some examples, have a negative exponential probability density function, $$pdf_q(x) = c \times e^{-(x+g)}$$

where c and g are a multiplicative and an additive constant, respectively.

Source Control

A malicious peer may attempt to push the same data packet (or group of data packets) multiple times to a given node i to try to find a pattern in the local relay strategy of i. For example, a malicious peer node may create two connections to node i and monitor how incoming and outgoing traffic for i are correlated. The source control sub-system is implemented by setting a particular threshold for the number of data packets that can be received from each peer. If a peer exceeds the threshold for a given data packet, its connection will be permanently or temporarily closed. The number of instances in which a node receives a given data packet, such as a blockchain transaction, may be stored in the RDR table.

Load Balancing

Load balancing may be used to periodically perform a shuffle of data packets already allocated for relay to peers by the other sub-systems. The purpose of the load balancing module is to average the relay distribution among the peers, to avoid traffic overload in some peer connections or single point of failures. Two different approaches to load balancing may be implemented:
  Each data packet j has the same weight $w_j$ despite their size (i.e. number of inputs, number of outputs, unlocking and locking script size)
  Each data packet j has its own weight $w_j$, proportional to its size in bytes For example, in method 800, a second allocation of the second data packets to the fixed set of neighbouring nodes may be determined, the second allocation being a re-arrangement of the first allocation to account for balancing traffic at output interfaces of the node. A cumulative value $c_i$ can be computed for each peer i over the number of data packets $n_i$ scheduled to relay:

$$c_i = \sum_{k=1}^{n_i} w_k(i)$$

Subsequently, an iterative method is performed to shuffle the data packets to relay and obtain an average c* value for each peer:

$$c^* = \frac{\sum_{i=1}^{m} c_i}{m}$$

Various different heuristics addressing this shuffle of data packets may be available. For example, different priorities may be assigned to different sub-systems, in order to anticipate the relay of a subset of data packets or enhance the load balancing for the outgoing traffic. Moreover, the execution of different sub-systems can introduce duplicates or inconsistent allocations of data packets, which need to be solved before the activation of the relay.

Figure 13:
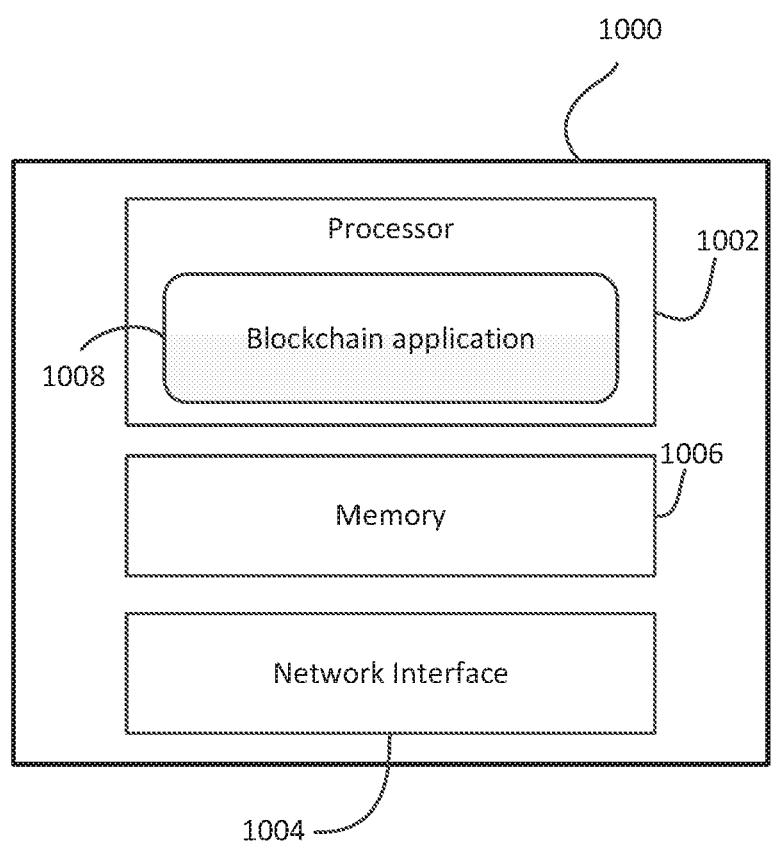
FIG. 13 shows, in block diagram form, an example blockchain node.

Reference will now be made to FIG. 13, which shows, in block diagram form, a simplified example of a participating node 1000. The node 1000 includes a processor 1002, which may include one or more microprocessors, application specific integrated chips (ASICs), microcontrollers, or similar computer processing devices. The node 1000 further includes memory 1004, which may include persistent and non-persistent memory, to store values, variables, and in some instances processor-executable program instructions, and a network interface 1006 to provide network connectivity over wired or wireless networks.

The node 1000 includes a processor-executable blockchain application 1008 containing processor-executable instructions that, when executed, cause the processor 1002 to carry out one or more of the functions or operations described herein.

It will be understood that the devices and processes described herein and any module, routine, process, thread, application, or other software component implementing the described method/process for configuring the blockchain node may be realized using standard computer programming techniques and languages. The present application is not limited to particular processors, computer languages, computer programming conventions, data structures, or other such implementation details.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. In the present specification, "comprises" means "includes or consists of" and "comprising" means "including or consisting of". The singular reference of an element does not exclude the plural reference of such elements and vice-versa. The invention may be implemented by means of hardware comprising several distinct elements, and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage.

The invention claimed is:

1. A computer-implemented method of propagating data packets in a network of nodes, each node in the network having one or more connections to other nodes, the method comprising:
   generating at least one data packet of a first type;
   collecting a set of data packets of the first type during a first time period, the set including the at least one generated data packet and at least one data packet of the first type received from one or more first nodes in the network;
   determining a mapping of the data packets of the set to a plurality of neighbouring nodes connected to a node, the mapping indicating an expected time of relay of each data packet of the set to neighbouring nodes, wherein determining the mapping includes determining at least one of:
      a first sub-mapping which allocates any two data packets having a same source for relay to different subsets of the plurality of neighbouring nodes; and
      a second sub-mapping which assigns different expected times of relay to any two data packets generated at the node or received by the node from the one or more first nodes in a same time interval; and
   transmitting the data packets of the set to the plurality of neighbouring nodes according to the determined mapping.

2. The method of claim 1, wherein determining the first sub-mapping comprises:
   for each of the at least one generated data packet:
      identifying a predetermined number of first data packets of the first type previously generated by the node;
      obtaining a list of relay node sets associated with the first data packets, the relay node sets including neighbouring nodes to which the first data packets are respectively relayed; and
      selecting a first set of relay nodes based on identifying a set of neighbouring nodes different from the relay node sets in the obtained list.

3. The method of claim 2, wherein selecting the first set of relay nodes comprises arbitrarily selecting a set of two or more neighbouring nodes not included in the obtained list.

4. The method of claim 2, wherein the selected first set is different from relay node sets in the obtained list by at least two nodes.

5. The method of claim 2, wherein a number of neighbouring nodes selected for inclusion in the first set is arbitrarily determined.

6. The method of claim 2, wherein a number of neighbouring nodes selected for inclusion in the first set is bounded according to bandwidth requirements of the node.

7. The method of claim 1, wherein determining the first sub-mapping comprises:
   for each of the one or more first nodes:
      identifying a predetermined number of second data packets of the first type most recently received from the first node; and
      determining a first allocation of the second data packets to a fixed set of neighbouring nodes, the first allocation being selected from one or more allocations of the second data packets to neighbouring nodes satisfying a predetermined condition.

8. The method of claim 7, wherein an allocation of second data packets to the fixed set of neighbouring nodes satisfies the predetermined condition if, for any two of the second data packets, a number of neighbouring nodes to which both said second data packets are allocated is less than or equal to a predefined threshold.

9. The method of claim 7, wherein for any two of the first nodes, a set of all second data packets received from said two first nodes is allocated to at least two different neighbouring nodes in the first allocation.

10. The method of claim 7, further comprising determining a second allocation of the second data packets to the fixed set of neighbouring nodes, the second allocation being a re-arrangement of the first allocation for balancing traffic at output interfaces of the node.

11. The method of claim 7, wherein determining the second sub-mapping comprises:
for each of one or more data packets of the set:
determining a next scheduled time of relay of the data packet to neighbouring nodes; and
relaying the data packet a predetermined amount of time after the next scheduled time of relay.

12. The method of claim 11, wherein the predetermined amount of time is a multiple of the first time period.

13. The method of claim 1, further comprising setting a maximum number of data packets capable of being received from each of the one or more first nodes.

14. A computing device to participate in a process for transmitting content for an entity to a blockchain, the computing device configured to carry out the method claimed in claim 1.

15. A non-transitory processor-readable medium storing processor-executable instructions to participate in a process for propagating data packets in a network of nodes, wherein the processor-executable instructions, when executed by a processor in a participating node, cause the processor to carry out the method claimed in claim 1.

16. A computing device to participate in a process for transmitting content for an entity to a blockchain, the computing device configured to carry out the method claimed in claim 2.

17. A computing device to participate in a process for transmitting content for an entity to a blockchain, the computing device configured to carry out the method claimed in claim 3.

18. A computing device to participate in a process for transmitting content for an entity to a blockchain, the computing device configured to carry out the method claimed in claim 7.

19. A non-transitory processor-readable medium storing processor-executable instructions to participate in a process for propagating data packets in a network of nodes, wherein the processor-executable instructions, when executed by a processor in a participating node, cause the processor to carry out the method claimed in claim 2.

20. A non-transitory processor-readable medium storing processor-executable instructions to participate in a process for propagating data packets in a network of nodes, wherein the processor-executable instructions, when executed by a processor in a participating node, cause the processor to carry out the method claimed in claim 7.

* * * * *